W. V. TURNER.
FLUID PRESSURE BRAKE.
APPLICATION FILED SEPT. 25, 1913.
1,131,972.
Patented Mar. 16, 1915.
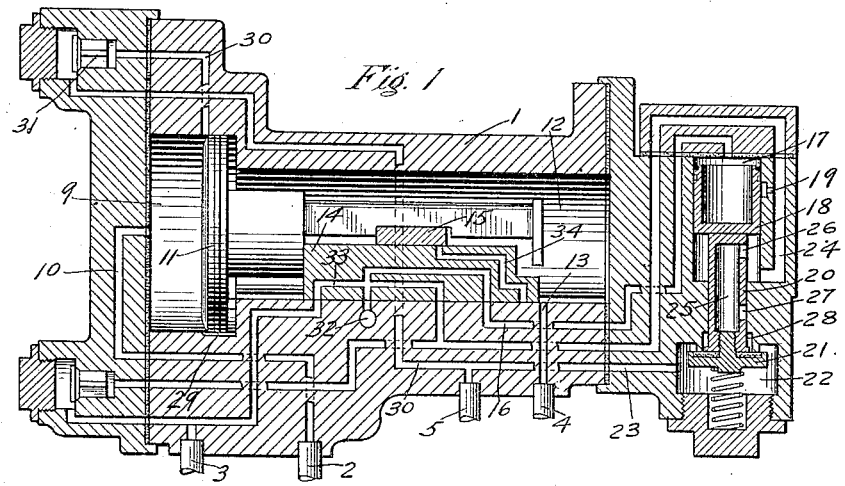
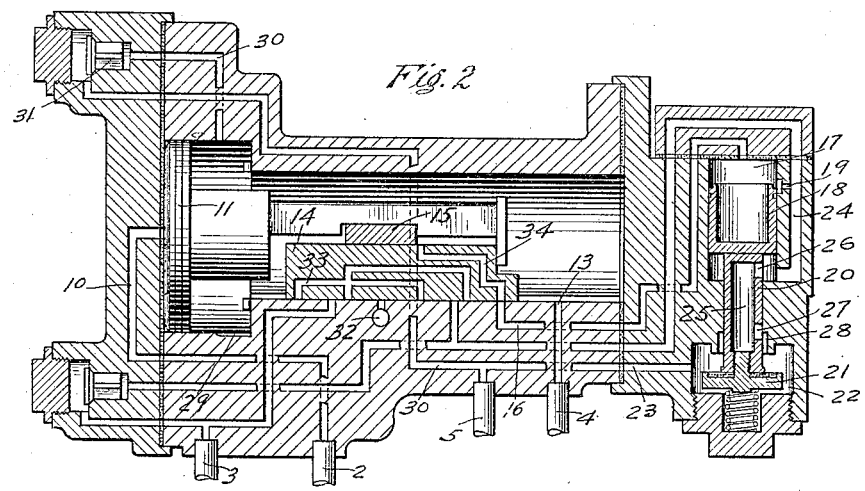
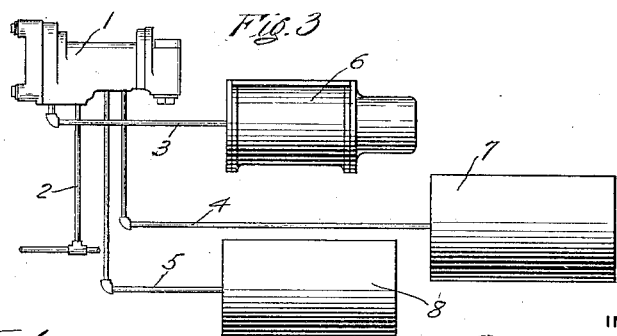
WITNESSES
INVENTOR
Walter V. Turner
by Wm. H. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,131,972. Specification of Letters Patent. Patented Mar. 16, 1915.

Application filed September 25, 1913. Serial No. 791,745.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a valve device for controlling the supply of fluid under pressure to the brake cylinder.

Heretofore, it has been necessary to provide different size service ports for supplying fluid to the brake cylinder in service applications of the brakes, to correspond with size of brake cylinder employed, so that the time required to secure a given degree of pressure in the brake cylinder would be the same on all cars regardless of the size of the brake cylinder.

The principal object of my invention is to provide means for securing a rate of flow to the brake cylinder in service corresponding with the size of the brake cylinder employed without varying the size of the usual service port.

In the accompanying drawing; Figure 1 is a central sectional view of a valve device embodying my invention, showing the parts in normal release position; Fig. 2 a similar view, showing the parts in application position; and Fig. 3 a diagrammatic view of a car air brake equipment showing the improved valve device applied thereto.

As shown in Fig. 3 of the drawing, the controlling valve device 1 is connected to train pipe 2 and by pipes 3, 4, and 5 respectively to brake cylinder 6, auxiliary reservoir 7, and service reservoir 8.

In order to illustrate one application of my invention, the same is shown as applied to a valve device having a piston chamber 9, connected by passage 10 to train pipe 2 and containing piston 11, and a valve chamber 12, connected by passage 13 to auxiliary reservoir pipe 4 and containing main slide valve 14 and graduating slide valve 15 mounted on the main slide valve and having a movement relative thereto.

According to my improvement, the passage 16, through which fluid is supplied to the brake cylinder in a service application of the brakes, communicates with a piston chamber 17 containing a piston 18 and communication from said passage to the brake cylinder is provided through a port 19 which is opened to piston chamber 17 upon movement of the piston 18. The piston 18 carries a hollow stem 20 having a valve 21 on the end thereof and said valve controls communication from a chamber 22, which communicates through passage 23 with service reservoir pipe 5, to passage 24 leading to the brake cylinder. Cavity 25 in the hollow stem 20 is provided with a port 26 constantly open to passage 24 and a port 27 adapted to register with a groove 28 upon movement of the piston 18 to open the valve 21.

In operation, fluid supplied to the train pipe flows through passage 10 to piston chamber 9 and thence through feed groove 29 to valve chamber 12. The auxiliary reservoir 7 is charged from the valve chamber 12 through passage 13 and the service reservoir is charged through passage 30 containing check valve 31. In the release position of the triple valve, as shown in Fig. 1 of the drawing, passages 16 and 24 are connected to exhaust port 32 through cavity 33 in the main slide valve 14 and service reservoir pressure in chamber 22 acts on valve 21 to hold the same in its closed position. Upon effecting a reduction in train pipe pressure the triple valve piston 11 is shifted to application position, as shown in Fig. 2 of the drawing, in which service port 34 registers with passage 16. Fluid thereupon flows from the valve chamber 12 and the auxiliary reservoir to the piston chamber 17 and as the area of the piston 18 is greater than the effective area of valve 21 exposed to service reservoir pressure, the piston is shifted to a position opening the port 19, so that fluid can flow from the auxiliary reservoir through port 19 and passage 24 to the brake cylinder. At the same time, the valve 21 being open, fluid flows from the service reservoir and chamber 22 through groove 28, port 27, cavity 25, and port 26 to passage 24. The port 27 is arranged to open communication through the groove 28 simultaneously with the opening of the port 19 and the extent of opening varies according to the rate of reduction in train pipe pressure and the extent to which the usual service port is opened.

It will be noted that the area of stem 20 is exposed to service reservoir pressure while the differential area between the stem and the piston 18 is subject to brake cylinder pressure, so that these two pressures oppose the pressure of fluid in chamber 17 flowing to the brake cylinder and consequently by properly proportioning these areas, the rate of flow of fluid from the service reservoir can be made such as may be desired for a given size of brake cylinder. When fluid flows through an opening of given size to the brake cylinder, the larger the volume of the brake cylinder, the slower will be the rate of increase in brake cylinder pressure and since with the present construction, the movement of the valve mechanism which controls the brake cylinder supply port is governed by the brake cylinder pressure, if there is a tendency for the brake cylinder pressure not to build up at a given rate by reason of the size of the brake cylinder then the valve 21 will automatically open wider to permit of an increased flow of fluid to the brake cylinder. In this way, the additional port connection from the service reservoir to the brake cylinder serves to provide for securing a given brake cylinder pressure in the same time for any size brake cylinder while employing the same size service port in the triple valve.

Having now described my invention, what I claim as new and desire to secure by Letters Patent, is:

1. In a fluid pressure brake, the combination with a train pipe, brake cylinder, auxiliary reservoir, a service reservoir, and a valve device operated by a gradual reduction in train pipe pressure for supplying fluid from the auxiliary reservoir to the brake cylinder to effect a service application of the brakes, of means operated by the flow of fluid from said valve device to the brake cylinder in a service application for opening an additional communication for supplying fluid from the service reservoir to the brake cylinder.

2. In a fluid pressure brake, the combination with a brake cylinder, auxiliary reservoir, and a valve device for supplying fluid from the auxiliary reservoir to the brake cylinder to effect a service application of the brakes, of a service reservoir and means operated by the flow of fluid from the auxiliary reservoir to the brake cylinder in a service application for supplying fluid from the service reservoir to the brake cylinder.

3. In a fluid pressure brake, the combination with a brake cylinder, auxiliary reservoir, and a valve device for supplying fluid from the auxiliary reservoir to the brake cylinder, of a service reservoir, a piston operated by fluid from the auxiliary reservoir for opening communication from the auxiliary reservoir to the brake cylinder, and a valve operated by said piston for opening communication from the service reservoir to the brake cylinder.

4. In a fluid pressure brake, the combination with a brake cylinder, a source of fluid pressure, and a valve device operating upon a gradual reduction in train pipe pressure for supplying fluid from said source to the brake cylinder to effect a service application of the brakes, of a piston subject to the opposing pressures of the brake cylinder and the flow of fluid from said source to the brake cylinder in a service application for controlling an additional communication for supplying fluid to the brake cylinder.

5. In a fluid pressure brake, the combination with a brake cylinder, an auxiliary reservoir, and a valve device for supplying fluid from the auxiliary reservoir to the brake cylinder to effect a service application of the brakes, of a service reservoir, a valve for controlling communication from the service reservoir to the brake cylinder, and a piston subject to the opposing pressures of the brake cylinder and the flow of fluid from the auxiliary reservoir to the brake cylinder in a service application for opening said valve.

6. In a fluid pressure brake, the combination with a brake cylinder, of a valve device for controlling the supply of fluid to the brake cylinder from one source of fluid pressure and means for varying the rate of flow of fluid to the brake cylinder from another source of fluid pressure to correspond with the size of the brake cylinder employed.

In testimony whereof I have hereunto set my hand.

WALTER V. TURNER.

Witnesses:
A. M. CLEMENTS,
S. W. KEEFER.